July 25, 1944.   K. RATH   2,354,545
OPTICAL EXPOSURE METER
Filed July 8, 1943
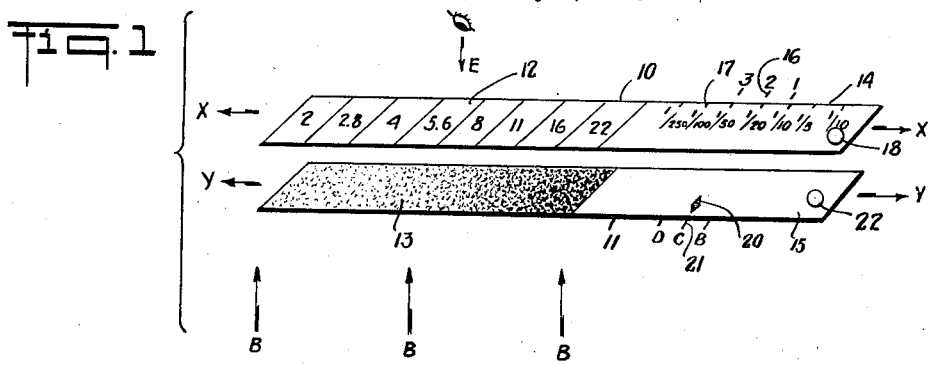
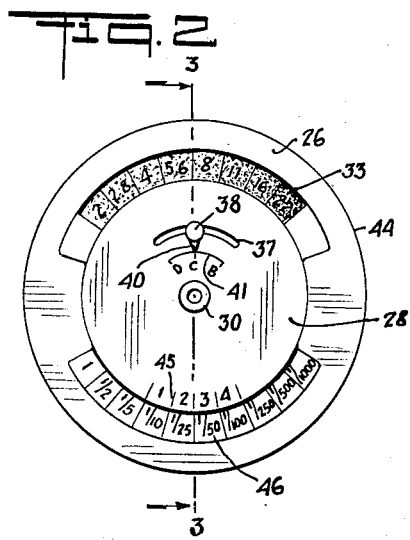
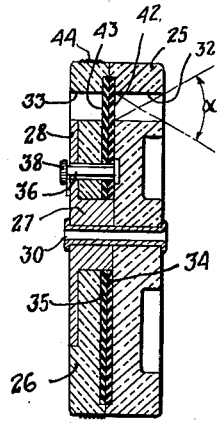
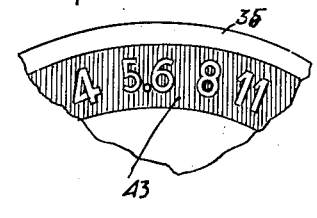
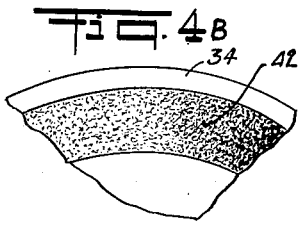
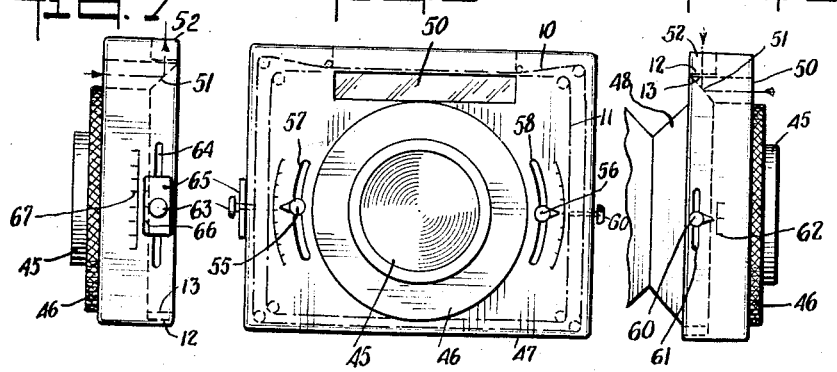
INVENTOR.
BY Patented July 25, 1944

2,354,545

UNITED STATES PATENT OFFICE 2,354,545

OPTICAL EXPOSURE METER

Karl Rath, New York, N. Y.

Application July 8, 1943, Serial No. 493,851

6 Claims. (Cl. 88—23)

My invention relates to optical exposure meters of the extinction type and among the objects of the invention is to provide a meter of this character operating on the so-called direct reading principle, as explained and described in my copending patent application Ser. No. 393,007, filed May 12, 1941, and entitled Photographic exposure meter, now Patent No. 2,323,676.

The meter described in the above-mentioned application is basically distinguished from other exposure meters known in the art, in that all the necessary adjustments for a desired film speed and one of the main exposure controlling values, viz. lens aperture or stop and exposure time, are made in advance, whereupon the co-ordinated exposure control value for a given scene or object brightness can be directly read prior to the taking of a photograph, substantially without requiring any additional adjustments or manipulation. This direct reading operation is maintained as long as the same pre-selected values are used by the photographer.

The present invention has for its further object to provide a meter of the above character being of simplified construction and which can be easily and instantaneously read and operated.

Other objects and aspects of my invention will become more apparent from the following detailed description taken in reference to the accompanying drawing forming part of this specification and wherein:

Figure 1 is a schematic diagram illustrating an exposure meter embodying the principles of the invention; Figure 2 is a front view and Figure 3 is a cross-sectional view, respectively, taken along line 3—3 of Figure 2 and showing a practical embodiment of an exposure meter designed according to Figure 1; Figures 4A and 4B are fragmentary detail views showing the construction of the light gauge element embodied in the meter according to Figures 2 and 3; and Figure 5 is a front view and Figures 6 and 7 are side views illustrating a modified meter construction according to the invention.

Like reference characters identify like parts in the different views of the drawing.

Referring to Figure 1, I have shown schematically at 10 and 11 a pair of relatively adjustable members having, in the example shown, the form of strips or plates movable in the direction of the arrows x—x and y—y, respectively, and having at least a portion thereof shown at 12 and 13 superimposed upon one another and consisting of Celluloid, cellulose acetate or any other suitable translucent or transparent material. Portion 12 of member 10 has applied thereto a lens aperture or stop scale comprising a series of well-known F-numbers ranging from F.2 to F.22 in the example illustrated, and being constituted by opaque material applied to a substantially transparent background. Alternatively, the stop or other scale numbers may be transparent and the surrounding areas or background may be opaque in the manner of a photographic negative as shown in Figure 4A.

Portion 13 of member 11 underlying the scale portion 12 of member 10 constitutes a photometric wedge having an opacity increasing gradually or step-by-step from left to right in such a manner that one of the stop numbers or member 12 will be just barely visible or merge with its background, if the light gauge composed of members 12 and 13 is illuminated on one side by light rays indicated by arrows B and emanating from a photographic scene or object and if the other side of the light gauge is viewed in the direction of the arrow E by an observer. For a given exposure time or shutter speed, the number on the light gauge ascertained as being just barely visible will then indicate the proper setting of the stop or aperture of a camera for obtaining a correctly exposed photograph, as is readily understood by those skilled in the art.

Thus, the design of the wedge 13 may be such, that for the lowest scene brightness or intensity of the light rays B, the number 2 will be just barely visible while all the other numbers are concealed by the wedge 13, indicating that a stop F.2 should be used for correctly setting the shutter of a camera. On the other hand, for the highest scene brightness or intensity of the light rays B, all the numbers on the light gauge may be plainly visible with the exception of the number 22 which just merges into its background, whereby to indicate a necessary stop setting of F.22 to obtain a correctly exposed picture. For all intermediate degrees of scene brightness B, a corresponding F-number will be just barely visible and can be easily and instantly ascertained and read in the manner described.

In order to use a meter of this type for other shutter speeds and for different film or emulsion sensitivities and other factors controlling the final exposure values, I have shown either or both of the members 10 and 11 to be provided with scale portions 14 and 15, respectively, in addition to or co-extensive with the portions 12 and 13 forming the light gauge or measuring device proper, said scale portions being arranged to cooperate with fixed or stationary scales in such a manner that, upon pre-selection of desired and/or required values of said scales, the coordinated stop on member 12 may be read instantly without any additional adjustment or manipulation in the manner set forth hereinabove.

For this purpose, portion 14 of member 10, in the example shown, is provided with an exposure time scale 17, ranging from 1/250 sec. to 1/10 sec., and arranged to cooperate with a fixed or stationary scale 16 calibrated in film speed numbers 1, 2 and 3 representing low, medium and high speed films or plates, respectively. In this manner, adjustment of member 10 by the aid of adjusting knob 18 so that a desired exposure time, say 1/25 sec., is opposite to the speed number on scale 16 corresponding to the film used in the camera (medium film speed 2 according to the example under consideration) will result in the proper relative alignment of the light gauge elements 12 and 13 in such a manner that the required stop number will be just barely visible for any given brightness of the object or scene to be photographed towards which the wedge or light gauge is aimed in the operative position of the meter held at a convenient distance from the observer's eye.

As will be understood, the exposure time and stop scales as well as the light gauge members 12 and 13 may be mutualy interchanged without substantially affecting the operation of the meter, the only difference being that in the former case an initial choice or pre-setting of the stop and speed of the film used, will result in a direct indication of the exposure time under various scene or object brightness conditions.

As is well known, extinction type exposure meters, especially those held at a distance from the observer's eye in the operative position, are subject to an error due to the varying sensitivity of the human eye under different general illumination or lighting conditions to which the eye is exposed. This is due to the fact that the eye responds logarithmically rather than linearly, which in other words means that the visual acuity or sensitivity of the eye decreases as the prevailing light intensity affecting the eye increases. As a result of this phenomenon, a measurement of a scene or object having a given brightness will be lower in bright sunlight, higher under a cloudy sky and still higher in dull surroundings such as deep shadows or interiors, resulting in an overexposure in the first case and underexposure in the latter case.

In order to consider the effect of the varying eye sensitivity in a simple manner, the portion 15 of the adjusting member 11 is provided with an index 20 arranged to cooperate with a fixed or stationary scale 21 representing different lighting conditions identified, in the example illustrated, by the letters B, C and D representing bright or sunny days, cloudy days and dull surroundings, respectively. Thus, by adjusting member 10 by the aid of adjusting knob 22 so that index 20 is opposite to the proper letter or other identifying mark of scale 21, wedge portion 13 will be displaced relative to the scale portion 12 of the light gauge to such an extent as to modify the extinction reading in accordance with the different general lighting conditions in such a manner as to substantially compensate for the error due to the varying eye sensitivity in the final exposure determination.

Thus, considering the adjustment shown for medium illumination or average lighting conditions (cloudy sky) with the index mark 20 adjusted to be opposite the letter C on scale 21, let it be further assumed that, for the film speed and exposure time adjustments shown, such as 1/25 sec. for a film of medium speed 2, stop number 8 on the light gauge will appear just barely visible and accordingly represent the proper value for setting the lens aperture of a camera to obtain a correctly exposed picture. With the scene brightness remaining constant, and assuming the lighting conditions to have changed in the bright direction that is from a cloudy to a bright sky, it will be found that due to the reduced eye sensitivity, stop number 8 will now be concealed by the wedge 13 and the next following number in the direction of increasing wedge transparency will now become just barely visible, i. e. the next lower stop number 5.6 in the example under consideration. In order to have stop number 8 remain barely visible, as should be the case since the scene brightness has been assumed to remain the same, wedge 13 is moved towards the right, or in other words index mark 20 is brought opposite to the mark or letter B on scale 21. If the eye sensitivity changes in the opposite i. e. in the dark direction such as by a change from a cloudy sky to dull surroundings, similar correction may be made by moving the wedge 13 to the left to cause the index mark 20 to be opposite to the letter D on scale 21, whereby to compensate for the error due to the varying eye sensitivity in an analogous manner as is readily understood from the above.

If the meter is intended for a fixed film speed, or if the film speed is considered otherwise, scale 16 may be omitted and replaced by a single fixed index mark in place of the series of marks or graduations shown. The same applies to scale 21, if the eye sensitivity is of no importance or considered in any other manner, such as by providing the meter in a known manner with an eye cup or shield to exclude extraneous light from the eye.

Referring to Figures 2 and 3, I have shown a practical construction of a meter of the type according to Figure 1. The meter shown comprises a first disc-shaped member or support 25 and a second disc-shaped member 26 rotatably mounted upon member 25. For this purpose, member 26 is provided with a central perforation so as to fit over the cylindrical sleeve portion 27 of a ring shaped element 28, members 26, 27 and 28 being rigidly secured together by a rivet 30 or in any other suitable manner. Members 25 and 26 may consist of any suitable material such as Bakelite or other plastics and member 27, 28 consists preferably of metal but may be of any other material. In this manner, disc 26 may be rotated relative to disc 25, the former corresponding to member 10 and the latter corresponding to member 11 of Figure 1.

Both discs are provided with registering arcuate slots 32 and 33, respectively, adapted to receive the light gauge or photometric wedge elements and designed to provide a limited acceptance angle α for the meter corresponding to the field or picture angle of a camera (about 45° for the average camera) in the manner described in detail in my above mentioned copending application. For this purpose, the inner surfaces of both discs 25 and 26 are formed with suitable depressions adapted to receive a pair of flat discs 34 and 35, respectively, of Celluloid, cellulose derivative or any other suitable transparent or translucent material. Disc 34 is arranged rotatably relative to the member 25 by the provision of a shaft 36 having its inner end attached thereto and passing through suitable arcuate slots 37 in the disc 35, and members 26 and 28, said shaft terminating in an adjusting knob 38 projecting above the surface of member 28. Knob 38 has an index 40 arranged to cooperate with a scale 41 representing general lighting conditions and applied to the member 28. Disc 34 is further provided with an arcuate photometric wedge 42 (see Figure 4B) in register with the slots 32 and 33 of members 25 and 26 and corresponding to the wedge 13 of Figure 1.

Disc 35 is fixedly secured to the member 26 by gluing or a similar connection and is provided with an arcuate stop scale 43 (see Figure 4A) also being in registry with the slots 32 and 33 and overlying the wedge 42 in substantially the same manner as shown in Figure 1. The stop scale 43 has a black or opaque background with the stop numbers thereon forming transparent areas as shown in Figure 4A. The outer cylindrical surface of member 26 is suitably roughened or knurled as shown at 44 to facilitate the operation and adjustment of the meter. The lower peripheral portion of disc 28 has applied thereto a film speed scale 45 cooperating with an exposure time scale 46 applied to the adjacent part of member 26.

The operation and use of the meter according to Figures 2 and 3 is substantially the same as described in connection with Figure 1. The setting of a desired shutter speed on scale 46 opposite to the speed number of the film used appearing on scale 45 by rotation of member 26, will enable a direct reading of the coordinated stop in the slot 33 by properly aiming the meter in the direction of the scene or object to be photographed, whereby said scene will be encompassed by the acceptance angle α, and viewing the aperture 33 with the meter held at a convenient distance from the observer's eye. The varying eye sensitivity is taken in consideration by setting knob 38 so that its index will be opposite the proper identifying mark on scale 41, resulting in a proper displacement of wedge portion 42 relative to scale portion 43 in exactly the same manner as described hereinabove.

Referring to Figures 5 to 7, I have shown a modified meter construction according to the invention using endless strips or bands 10 and 11 provided with the light gauge portions 12 and 13, said bands passing over rollers and being adapted for mounting about the lens 45 and shutter 46 of a camera of any suitable construction. The lens and shutter are housed in a flat rectangular casing 47 which may be connected to the main camera body through a bellows 48 or which may form the front part of a box-type camera of any known construction. The light impinged upon the light gauge is admitted through an oblong opening 50 in the front wall of casing 47 which may be covered by a ground or diffusing glass if desired and deflected upwardly by a mirror or the like 51 before passing through the superposed wedge elements 12 and 13 of strips or bands 10 and 11 constituting the light gauge and viewable through a sighting aperture or slot 52 in the top wall of casing 37.

Items 55 and 56 represent the stop and aperture adjustments projecting through slots 57 and 58 in the front wall of casing 47 and arranged to cooperate with adjusting scales as shown in the drawing. In the operation of the meter, the adjustment of the band or strip 11 is effected by the aid of a knob 60 passing through a slot 61 in strip 10 and one side wall of the casing 47 and cooperating with a scale of general lighting condition indicated at 62. Similarly, the adjustment of strip 10 is effected by means of a knob 63 attached thereto and passing through a slot 64 in the opposite side wall of casing 47, knob 63 carrying a plate 65 provided with a scale 66 representing film speed numbers and arranged to cooperate with a fixed scale 67 representing exposure time values. The operation is otherwise substantially the same as that of the previously described meter as will be readily understood from the above.

It will be evident from the foregoing that my invention is not limited to the specific details, arrangements of parts and constructions shown herein for illustration, but that the underlying novel inventive principle and thought are susceptible of numerous variations and modifications coming within the broader scope and spirit of my invention as defined by the accompanying claims. The specification and drawing are accordingly to be regarded in an illustrative rather than in a limiting sense.

I claim:

1. An extinction type exposure meter for determining the stop and exposure time adjusting values for a photographic camera comprising a first member, a second member adjustable relative to said first member, a photometric wedge coextensive with said first member, a scale member coextensive with said second member, said scale member having relatively opaque and transparent portions representing scale numbers for one of said adjusting values and being superimposed upon said wedge, whereby with said wedge being illuminated by light emanating from a photographic scene, the number just barely visible will be indicative of the required respective camera adjustment, and a further scale upon said second member representing the other of said adjusting values and arranged to cooperate with at least one adjusting index upon said first member.

2. An extinction type exposure meter for determining the stop and exposure time adjusting values for a photographic camera comprising a first member, a second member adjustable relative to said first member, a photometric wedge coextensive with said first member, a scale member coextensive with said second member, said scale member having relatively opaque and transparent portions representing scale numbers for one of said adjusting values and being superimposed upon said wedge, whereby, with said wedge being illuminated by light emanating from a photographic scene, the number on said scale member just barely visible will be indicative of the required respective camera adjustment, a second scale upon said second member representing the other of said adjusting values, and a third scale upon said first member representing an additional exposure controlling factor, said third scale being arranged adjacent and in cooperative relation to said second scale, for displacing said wedge relative to said scale member in accordance with the relative adjustment of said second and third scales, to consider different values of said second and third scales in the number read off said scale member.

3. An extinction type exposure meter comprising a first member, a second member adjustable relative to said first member, a photometric wedge mounted upon said first member, a scale member carried by said second member, said scale member having relatively opaque and transparent portions representing a lens aperture scale for a camera and being superimposed upon said wedge, whereby, with said wedge being illuminated by light emanating from a photographic scene, the number on said scale just barely visible will be indicative of the required aperture adjustment for a camera, a second scale upon said second member representing exposure time values and arranged to cooperate with at least one index upon said first member.

4. An extinction type exposure meter for determining the stop and exposure time adjusting values for a photographic camera comprising a first member, a second member adjustable relative to said first member, a photometric wedge also adjustable relative to said first member, a scale member fixedly secured to said second member, said scale member having relatively opaque and transparent portions representing consecutive scale numbers for one of said adjusting values and being superimposed upon said wedge, whereby, with said wedge being illuminated by light emanating from a photographic scene, the number of said scale just barely visible will be indicative of the required respective camera adjustment, a further scale upon said second member representing the other of said adjusting values and arranged to cooperate with at least one index upon said first member, for displacing said wedge relative to said scale member in accordance with the adjustment of said second scale, and further index means upon said first member in cooperative relation to said wedge for adjusting said wedge in accordance with an additional exposure controlling factor.

5. An extinction type exposure meter comprising a first member, a second member adjustable relative to said first member, a photometric wedge also adjustable relative to said first member, a scale member fixedly secured to said second member, said scale member having relatively opaque and transparent portions representing a lens aperture scale and being superimposed upon said wedge, whereby, with said wedge being illuminated by light rays emanating from a photographic scene, the number of said scale just barely visible will be indicative of the proper aperture adjustment for a camera, a second scale upon said second member representing exposure times, a third scale upon said first member representing film speeds and arranged adjacent and in cooperative relation to said second scale, a fourth scale upon said first member representing general lighting conditions, and means for adjusting said wedge relative to said fourth scale, whereby to consider different film speeds and the effects of the varying eye sensitivity in the aperture number read off said scale member.

6. An extinction type exposure meter for determining the stop and exposure time adjusting values for a photographic camera comprising a first member, a second member adjustable relative to said first member, a photometric wedge coextensive with one of said members, a scale member coextensive with the other member, said scale member having relatively opaque and transparent portions representing scale numbers for one of said adjusting values and being superimposed upon said wedge, whereby, with said wedge being illuminated by light emanating from a photographic scene, the number just barely visible will be indicative of the required respective camera adjustment, and a further scale upon one of said members representing the other of said adjusting values and arranged to cooperate with at least one adjusting index upon the other member.

KARL RATH.